(12) United States Patent
Berko et al.

(10) Patent No.: US 12,244,602 B2
(45) Date of Patent: *Mar. 4, 2025

(54) AUTOMATIC USER GROUP MANAGER

(71) Applicant: Acronis International GmbH, Schaffhuasen (CH)

(72) Inventors: Nickolay Berko, Schaffhausen (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 248 days.

This patent is subject to a terminal disclaimer.

(21) Appl. No.: 17/804,832

(22) Filed: May 31, 2022

(65) Prior Publication Data

US 2023/0388313 A1 Nov. 30, 2023

(51) Int. Cl.
*H04L 9/40* (2022.01)
(52) U.S. Cl.
CPC .......... *H04L 63/104* (2013.01); *H04L 63/102* (2013.01); *H04L 63/107* (2013.01)
(58) Field of Classification Search
CPC .... H04L 63/104; H04L 63/102; H04L 63/107
USPC .......................................................... 726/4
See application file for complete search history.

(56) References Cited

U.S. PATENT DOCUMENTS

| | | | |
|---|---|---|---|
| 10,367,835 B1 * | 7/2019 | Raviv | H04L 63/1425 |
| 10,496,416 B2 | 12/2019 | Aseev et al. | |
| 10,754,936 B1 * | 8/2020 | Hawes | G06F 21/45 |
| 10,817,542 B2 | 10/2020 | Aseev et al. | |
| 11,410,168 B2 | 8/2022 | Lyadvinsky et al. | |
| 2007/0157288 A1 * | 7/2007 | Lim | H04L 63/105 726/1 |
| 2010/0257580 A1 * | 10/2010 | Zhao | H04L 63/1416 726/1 |
| 2017/0230391 A1 * | 8/2017 | Ferguson | G06N 7/01 |
| 2018/0375886 A1 * | 12/2018 | Kirti | H04W 12/086 |
| 2020/0244693 A1 * | 7/2020 | Ghorbani | H04L 63/1433 |
| 2021/0006572 A1 * | 1/2021 | Keren | H04L 63/1425 |
| 2021/0152581 A1 * | 5/2021 | Hen | H04L 63/1416 |
| 2023/0231854 A1 * | 7/2023 | Blake | H04L 63/1425 726/4 |

OTHER PUBLICATIONS

Final Office Action from U.S. Appl. No. 17/804,823, dated Jul. 9, 2024, 8 pp.

* cited by examiner

*Primary Examiner* — Tauqir Hussain
(74) *Attorney, Agent, or Firm* — ESPE Legal Consultancy FZ-LLC

(57) ABSTRACT

A system of automatically managing assignments of users to user groups comprises a processor to implement instructions for an automatic user group manage (AUGM) to access to two or more users and the assignments of the users to the user groups, observe activity of the users, calculate user behavior signatures for one of at least two users of the users, at least one user of the users and one group of the user groups, or at least two groups of the user groups, calculate a numeric degree of variance between at least two of the user behavior signatures, compare the calculated degree of variance to at least one threshold, and determine if a behavior of one of the at least two users, the at least one user and the one group, or the at least two groups are similar or different.

20 Claims, 3 Drawing Sheets

AUTOMATIC USER GROUP MANAGER

TECHNICAL FIELD

The invention pertains to multi-user computer systems and protection of data on the computer systems from loss from actions caused by people or events, such as threat agents and threat events.

BACKGROUND

Computer systems rely in their functionality on different types of data that include operating systems, applications, application settings, files (contents and metadata), data in transit (e.g., part of network traffic), data in computer memory (e.g., application variables and clipboard), and databases or other data storages.

Information security (INFOSEC) systems are designed for keeping information confidential, available, and assuring its integrity.

A specific subclass of INFOSEC systems is Data Loss Prevention (DLP), systems that enforce information storage and transfer rules.

First, DLP systems enforce the storage rules demanding that certain types of information are stored only in approved locations and may take steps in case if such system detects certain information in an unauthorized location.

Second, DLP systems make sure that information may only be transmitted by a sender who has permission to send such information to a receiver who has permission to receive such information from the sender.

DLP systems deploy numerous controls including preventive that prevent data dissemination to unauthorized users, detective (e.g., controls designed to detect and investigate attacks, data leakage incidents, errors or irregularities), and corrective (e.g., controls designed to mitigate attacks, data leakage incidents, correct errors or irregularities). Currently, DLP systems use pre-defined by a vendor or manually configured sets of rules that govern their controls.

Computer systems include individual devices (nodes) that use networks and peripheral devices to communicate between themselves. These devices include computers, network routers, intrusion detection systems, network attached storage (NAS) devices, and USB Flash Drives.

In computer systems, individual people and applications (e.g., service accounts) are treated as users for purposes of permissions and tracking actions within these systems.

Further, computer systems recognize user groups as a common set of permissions, purpose, activity, and characteristics for individual users.

Normally, system administrations manually define which user groups individual users belong to and the permissions, purpose, activity, and characteristics of each user group, as well as what permissions are granted to users individually.

Manual creation of user groups presents multiple challenges to the security of the computer system. Such classifications are prone to human error because of assumptions about users based on bias and emotions not supported by actual user data. They require extensive involvement by a privileged person to be changed or optimized Finally, manual classifications are slow to implement because they usually require participation of a network administrator and representative of user community to identify the need to identify the need to create or remove a group or to assign/remove a user to/from a user group.

In many cases, the technical administrators don't have capability to monitor the activity of users close enough to be able to tell that existing grouping of users contradicts to clustering of users according to their behavior.

One of the examples may be a group, e.g., Accounting, that contains both accountants and software developers or DevOps, all having the same rights. Yet the analysis of their behavior would show that accountants behave distinctly from developers or DevOps: they access different websites, they access different systems, they use different software, they come to work and leave office at a different time. All these behavioral characteristics and activities may tell the admin that the group actually consists of two (or more) distinct groups of people depending on the selected function that calculates the Degree of Variance.

Even more, the same analysis may show that DevOps from the current accounting group behave in a way sufficiently similar to the members of the CorporateDevOps group.

The main problem with conventional systems is that (1) groups into which users are broken into are determined by human beings, and (2) assignment of users to groups is performed manually based on formal and subjective data (e.g., employee's job function and department).

The issue with such systems is that in some cases, administrators (e.g., software developers within an accounting department) cannot predict or even identify subgroups within individual departments or job functions due to their complexity.

SUMMARY

The present invention provides a system and a method for automatic grouping of users into groups based on behavioral signatures of users and groups. The invention solves problems in the prior art by allowing for an automatic determination of when a user may need to be split from the group and a user may be added to a group.

That may be particularly important at the beginning of the new user's employment period when the user only starts performing work functions that may be either undefined or fall outside of the existing restrictions, e.g., a user may be hired to perform cross-department functions.

The invention may also be applied to the so-called open systems, such as systems deployed in AI-moderated communities. When new users register with the system, they are classified into groups automatically. In that case, initial analysis may start when the first two users join the group. They may be either determined to behave differently from each other (and hence each one of them may be assigned a group) or similarly to each other (and hence they can be added to the same group). User grouping in open systems may be used for different purposes. Some examples of these purposes include resource-use optimization, scheduling, or targeted marketing.

Generally speaking, the invention is directed to an Automatic User Group Manager (AUGM), and a DLP with capability to automatically manage user groups and users within these groups.

The present invention automates the process of user grouping based on monitoring Behavioral Signatures of Users (BSU) or Behavioral Signatures of Groups (BSG), calculating a Degree of Variance (DoV) between BSU and BSG of a user U and a group G, between BSU1 and BSU2 of different users U1 and U2, or between BSG1 and BSG2 of different groups G1 and G2, and comparing the calculated DoV to a predetermined Variance Threshold (VT).

If the DoV is smaller or equal to the VT, then the system determines that the behaviors of (1) a given user and a given group are similar, (2) of two given users are similar, or (3) of two given groups are similar.

If the DoV is greater than the VT, then the system determines that the behaviors of (1) a given user and a given group are different, (2) of two given users are different, or (3) two given groups are different.

Accordingly, the AUGM automatically identifies specific user and group activity and characteristics, such as when one or more users behave differently from the group to which they belong. Such users are marked for reassignment from the group. Alternatively, the AUGM identifies a user outside of one group behaving similarly to another group. Such users are marked for reassignment to an alternative group. Or the AUGM identifies two different groups that are behaving similarly. Such groups are marked for possible combination.

The AUGM, following the same procedure, also automatically groups users in the system who have not been grouped yet.

The AUGM monitors the DoV value over time and responds accordingly. For example, if the DoV for two related objects (users or groups) is growing, but yet has not reached the VT, then the AUGM determines that it may be reached in the future. In such cases, the AUGM optionally suggests an investigative action. Such an action may be taken by the management of an entity to research the reason for the growing deviation of behaviors.

Similarly, if the DoV for two unrelated objects (users or groups) is decreasing, but yet has not reached the VT, then a prognosis is made that it may cross the VT and become lower than VT in the future. In such cases, an indication is given that further action is warranted to discover the reason for the observed decrease. Such further action may be taken by the system itself or by the entity managing the system.

SUMMARY OF FIGURES

The exemplary aspects of the invention will be better understood from the following detailed description of the exemplary embodiments of the invention with reference to the drawings.

DETAILED DESCRIPTION

Figure 1:
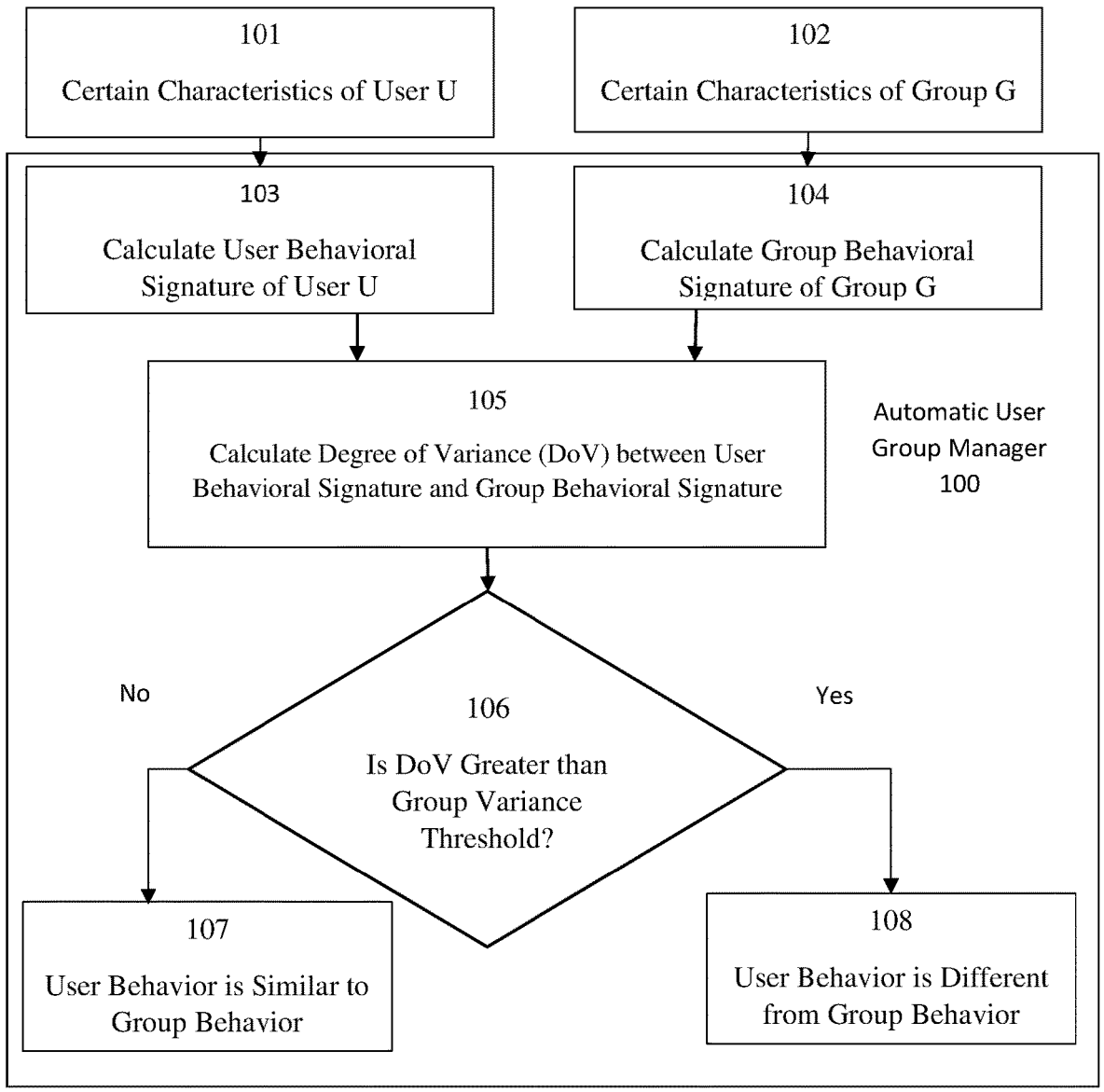
FIG. 1 shows an exemplary procedure for an operation of an Automatic User Group Manager that compares the behavioral characteristics and activity of a user to the behavioral characteristics and activities of a group according to an exemplary embodiment.

AUGM is a system that monitors activities and characteristics of users of a managed computer system and creates a log of user activities and characteristics.

The AUGM system uses the log to identify similarities or dissimilarities of such characteristics of one or more users associated with one or more user groups. and compares identified similarities or dissimilarities in observed user activities and characteristics to current user-to-user group assignments.

The AUGM system monitors user activities, such as user authentication, use of an application, or website visits. The AUGM system also accesses user-related data, such as position, department, or years of employment.

The AUGM system, therefore, is directed to a user-activity monitor that collects and logs user data. The system then creates a plurality of behavioral signatures for users or groups of users. A typical behavioral signature is an array, such as a vector, containing average values representing monitored events over a period of time for one user or a group of users.

In this context, a distance or degree of variance ("DoV") is a function of any two behavioral signatures of a user or a group. An example of such a degree of variance between two behavioral signatures is a mathematical distance between two vectors representing behavioral signatures of these users or groups.

DoV between an individual user and a group is determined by calculating a certain average signature for the group and then calculate the DoV between the user signature and the average group signature. Alternatively, DoV is determined by calculating the DoV between the user signature and all other users within that group. The maximum, average, mean or other certain other statistical function of all calculated DoVs is used as the DoV between the user and the group.

The AUGM uses one or more thresholds to make decisions of whether two behavioral signatures are similar. Examples are a similarity threshold ("ST") and a distinction threshold ("DT"). In some cases, ST may equal DT.

When the DoV between a user signature and a group signature is less than (or less than or equal to) the ST, a decision is made that user and group signatures are similar.

When the DoV between a user signature and a group signature is more than (or more than or equal to) the DT, a decision is made that user and group signatures are different.

If ST and DT are different, there may be some intermediate zone where the relationship of a user to a group is not determined because there are not enough similarities to determine that the user is similar to that group. There are also not enough distinctions to tell that the user is different from the group.

Implementation of this approach generally comprises the identifying groups of users with a similar behavior. This is done by comparing the DoV between user behavioral signatures lower (or lower or equal) than a predetermined threshold. identify users within groups whose behavior is different from the behavior of the group, e.g., the DoV between a group behavioral signature and a user behavioral signature is greater (or greater or equal) than a certain threshold; identify groups with a similar behavior, e.g., the DoV of group behavior signatures lower (or lower or equal) than a certain threshold; and identify users outside of a given group with a behavior similar to the given group, e.g., the DoV between the group behavioral signature and the user behavioral signature is less (or less or equal) than a certain threshold.

Often the difference in behavior of two subgroups of users within a given group of users of a networked computer system, such as a corporate information system, starts small and grows over time. The AUGM system collects user data and forecasts a user's behavior and preemptively applies corrective actions. For example, when the degree of variance between a given user behavioral signature and the group behavioral signature grows over time, but yet does not cross the group variance threshold, the system forecasts that the variance will in the future cross that threshold and take an appropriate, predetermined action.

The same result is obtained when the degree of variance between two users, a user and a group, or two groups is steadily decreasing, but does not yet cross the threshold of similarity.

Lowering or elevating the threshold of similarity or the threshold of variance of the AUGM changes its sensitivity.

Exemplary embodiments of the invention will now be described with reference to the drawings.

FIG. 1 shows an exemplary operation of an AUGM (100) that compares the Behavioral Signature of User U (101) to the Group Behavioral Signature of Group G (102).

AUGM (100) obtains access to Certain Characteristics of User U (101) and Certain Characteristics of Group G (102).

The AUGM (100) calculates the User Behavioral Signature of User U using Certain Characteristics of User U in step (103).

Further, the AUGM (100) calculates the Group Behavioral Signature of Group G using Certain Characteristics of Group G in step (104)

After accessing Certain Characteristics of Users (101), the AUGM (100) calculates the Degree of Variance (DoV) of the two signatures in step (105).

After calculating the DoV, the AUGM (100) compares the calculated DoV to the Group Variance Threshold in step (106).

If the calculated DoV is greater than the Group Variance Threshold, in step (107), the AUGM (100) makes the decision that the User Behavioral Signature of User U is different from the Group Behavioral Signature of Group G.

If the calculated DoV is less or equal to the Group Variance Threshold, in step (108), the AUGM (100) makes the decision that the User Behavioral Signature of User U is similar to the Group Behavioral Signature of Group G.

Figure 2:
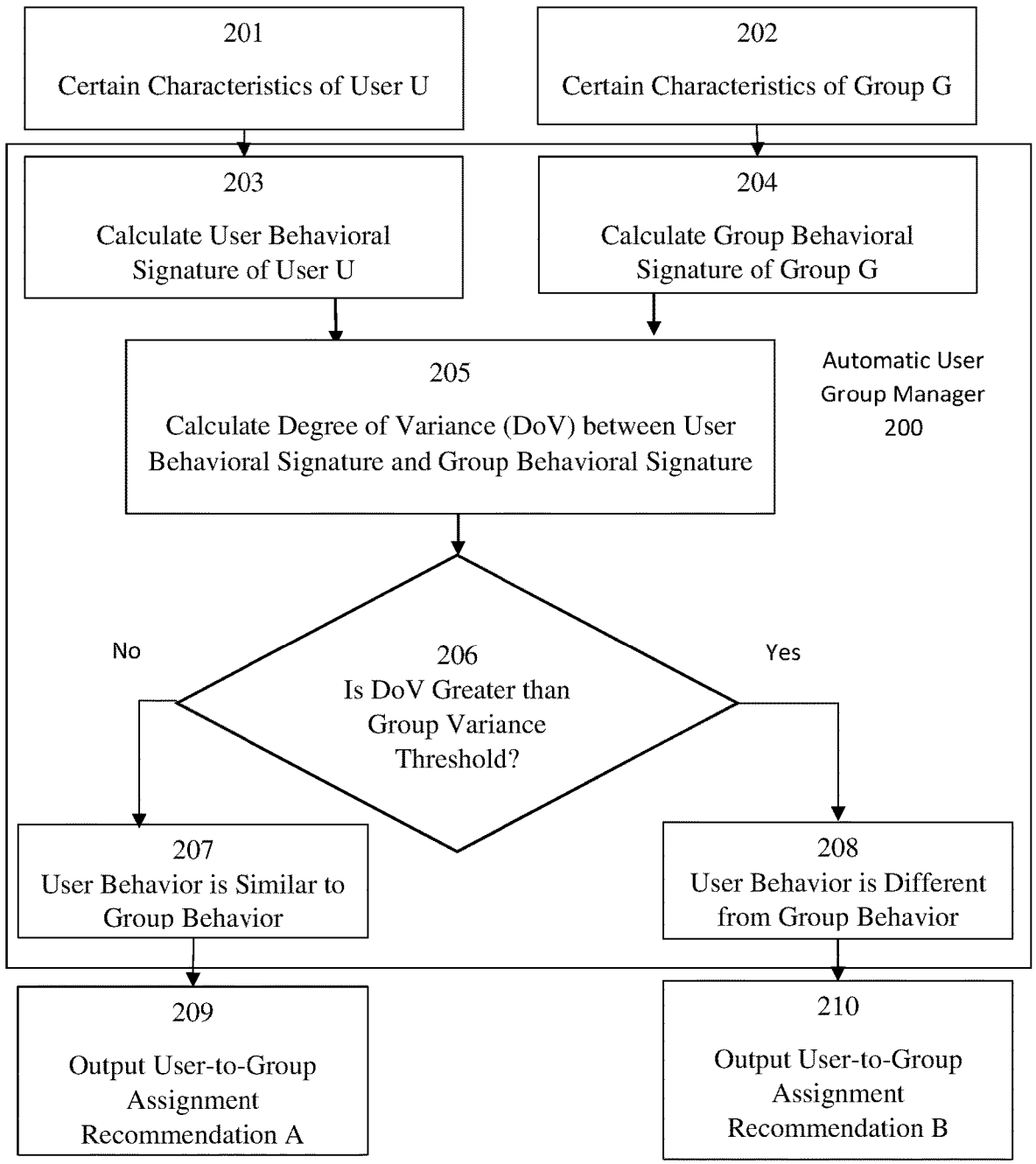
FIG. 2 shows the operation of an embodiment of an Automatic User Group Manager that outputs a user-to-group assignment recommendation according to another exemplary embodiment.

FIG. 2 shows another exemplary operation of an AUGM (200) that compares the Behavioral Signature of User U (201) to the Group Behavioral Signature of Group G (202).

At some point, the AUGM (200) obtains access to Certain Characteristics of User U (201) and Certain Characteristics of Group G (202), in any order.

The AUGM (200) calculates the User Behavioral Signature of User U using Certain Characteristics of User U in step (203).

Further, the AUGM (200) calculates the Group Behavioral Signature of Group G using Certain Characteristics of Group G in step (204)

After accessing Certain Characteristics of Users (201), the AUGM (200) calculates the Degree of Variance (DoV) of the two signatures in step (205).

After calculating the DoV, the AUGM (200) compares the calculated DoV to the Group Variance Threshold in step (206).

If the calculated DoV is greater than the Group Variance Threshold, in step (207), the AUGM (200) makes the decision that the User Behavioral Signature of User U is different from the Group Behavioral Signature of Group G, and in step (209), outputs the User-to-Group Assignment Recommendation A.

If the calculated DoV is less or equal to the Group Variance Threshold, in step (208), the AUGM (200) makes the decision that the User Behavioral Signature of User U is similar to the Group Behavioral Signature of Group G, and in step (210), outputs the User-to-Group Assignment Recommendation B.

Figure 3:
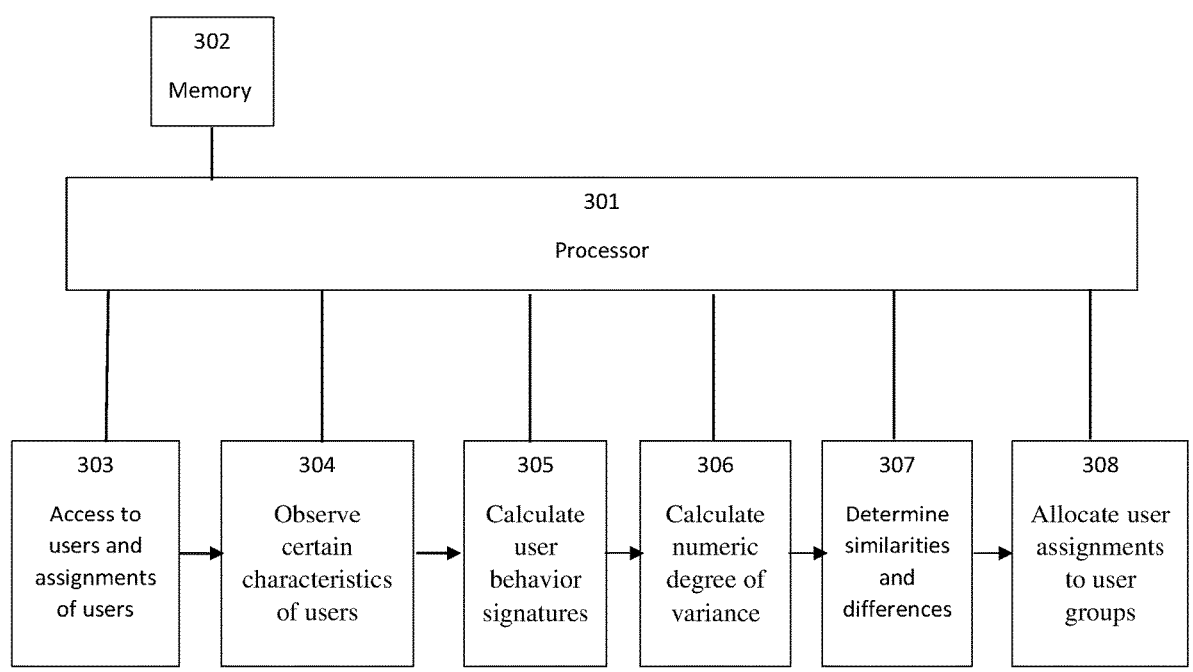
FIG. 3 shows the components and interactions of an exemplary system for an Automatic User Group Manager embodying the invention.

In an exemplary aspect, as shown in FIG. 3, system (300) automatically manages assignments of users to groups.

System (300) comprises a processor (301) (e.g., Central Processing Unit (CPU)) of a computer coupled to a memory (302) that stores instructions that are implemented by the processor (301).

The processor (301) is configured to implement the instructions for an automatic user group manager (AUGM) to access (303) to two or more users and the assignments of the users to the user groups, observe (304) characteristics of the users, calculate (305) user behavior signatures for one of at least two users of the users, at least one user of the users and one group of the user groups, or at least two groups of the user groups, calculate (306) a numeric degree of variance between at least two of the user behavior signatures, compare the calculated degree of variance to at least one threshold to determine (307) if a behavior of one of the at least two users, the at least one user and the one group, or the at least two groups are similar or different based on results of the comparison of the calculated degree of variance to the at least one threshold, and compare identified similarities or differences between the users or the user groups to allocate (308) the assignments of users to the user groups.

In an embodiment, such an AUGM observes actions of applications related to the user. These applications may be running, for example, on (1) user's computer or other devices, (2) when user is logged in, (3) when user is logged off, (4) under user credentials, (5) under other credentials than the user credentials but sharing access to at least one resource with user context, or (6) can otherwise be related to the user.

In an embodiment, such an AUGM observes beginning, end, frequency, and/or duration of events.

In an embodiment, such an AUGM observes user authentication events.

In an embodiment, such an AUGM observes user access to a user's computer, a mobile device, or other hardware devices.

In an embodiment, such an AUGM observes a user activity in a web browser.

In an embodiment, such an AUGM observes a user network traffic, such as IP addresses, port numbers, protocol types, communication with peripheral devices, volumes of data sent and received, and/or types of information sent and/or received (e.g., MIME types of files sent via FTP or high-level data category, e.g., Business data, Invoices, RnD, Architecture, etc.).

In an embodiment, such an AUGM observes user access to cloud services including but not limited to file storage, collaboration, electronic mail, scheduling, file sharing, database, analytical, social networks, etc.

In an embodiment, such an AUGM observes geolocation of a user's computer or a mobile device or IP-based geolocation of a user's device.

In an embodiment, such an AUGM observes user access to certain individual database records or groups of database records.

In an embodiment, such an AUGM observes the data related to user's communications such as email (e.g., sender, receiver, CC, BCC, size and time or the attachment(s), time sent, time received, etc.), SMS, MMS, or instant messaging (e.g., time sent, time received, sender, receiver, read indicator), MMS, and FTP.

In an embodiment, such an AUGM performs an analysis to identify a similar user behavior.

In an embodiment, such an AUGM performs an analysis to identify a dissimilar user behavior.

In an embodiment, such an AUGM performs an analysis to suggest removal of at least one user from at least one user group.

In an embodiment, such an AUGM performs an analysis to suggest addition of at least one user to at least one user group.

In an embodiment, such an AUGM performs an analysis with pre-programmed heuristic rules, statistical analysis, neural network, or support vector machines.

In an embodiment, such an AUGM performs suggested action and re-assigns a user to or from a group or communicates such assignment to at least one destination.

Moreover, other implementations of the present application will be apparent to those skilled in the art from consideration of the specification and practice of the teachings of the present application. Various aspects or components of the described example implementations may be used singly or in any combination. It is intended that the specification and example implementations be considered as examples only, with the true scope and spirit of the present application being indicated by the following claims.

The invention claimed is:

1. A method for automatically assigning users of a computer system to user groups by reference to a data collection of information about previously classified activities of a plurality of grouped users of the computer system, the method comprising:
   monitoring activity of a first user of the computer system;
   creating and storing a first user activity log for the monitored first user from the monitored first user activity;
   calculating a user behavior signature of monitored first user activity as a new behavior vector of values representing events related to the monitored activity;
   calculating a degree of variance (DoV) of the monitored first user activity from a behavior signature of the previously classified activities, wherein the behavior signature of the previously classified activities is a previous behavior vector of values representing events related to the previously classified activity, and the DoV is the distance between the new behavior vector and the previous behavior vector;
   comparing the (DoV) to a predetermined threshold;
   when the calculated DoV is less than or equal the predetermined threshold, determining that the first user will be assigned to a group with the previously grouped users associated with the behavior signature of the previously classified activities;
   when the calculated DoV is greater than the predetermined threshold, determining that the first user will not be assigned in the same group with the previously grouped users associated with the behavior signature of the previously classified activities;
   identifying the first user with the data collection of information about previously classified activities of a plurality of grouped users of the computer system; and
   sending an indication to a destination in the computer system about the determination of group assignment for the first user.

2. The method of claim 1, wherein the monitored activity of the first user comprises actions of applications related to the first user applications running on behalf of the first user, when the first user is logged in and logged off, or a resource of the computer system shared by the first user.

3. The method of claim 1, wherein the monitored activity of the first user comprises a beginning, an end, a frequency, or a duration of an event related to the first user.

4. The method of claim 1, wherein the monitored activity of the first user comprises a first user authentication event including timing Internet Protocol based geolocation or device-based geolocation.

5. The method of claim 1, wherein the monitored activity of the first user comprises the first user's access to the first user's computer, the first user's mobile device, or a hardware device associated with the first user.

6. The method of claim 1, wherein the monitored activity of the first user comprises activity in a web browser or other software accessing cloud services including file storage, online collaboration, electronic mail, scheduling, file sharing,or social networks.

7. The method of claim 1, wherein the monitored activity of the first user comprises first user network traffic including Internet Protocol addresses, port numbers, protocol types, volumes of data sent and received, and types of information sent and received.

8. The method of claim 1, further comprising analyzing a behavior vector of the first user for similarity and dissimilarity using pre-programmed heuristic rules, statistical analysis, a neural network, or support vector machines.

9. The method of claim 1, further comprising-analyzing a behavior vector of the first user to determine whether to add or remove the first user to or from at least one user group of the computer system.

10. The method of claim 1, comprising adding the first user to or removing the first user from a group of the user groups and communicating the addition or removal of the first user to at least one destination in the computer system.

11. In a computer network, a system for monitoring and automatically managing assignments of users to user groups, the system comprising:
   a data collection of information about previously classified activities of a plurality of grouped users of the computer network;
   a microprocessor coupled to a memory, the processor being configured to:
      monitor an activitiy of a first user of the computer network;
      create and store a user activity log for the monitored first user from the monitored first user activity;
      calculate a first user behavior signature of monitored user activity as a new behavior vector of values representing events related to the monitored activity
      calculate a degree of variance (DoV) of the monitored activity from a behavior signature of the previously classified activities, wherein the behavior signature of the previously classified activities is a previous behavior vector of values representing events related to the previously classified activity, and the DoV is the distance between the new behavior vector and the previous behavior vector;
      compare the DoV to a predetermined threshold;
      when the calculated DoV is less than or equal the predetermined threshold, determine that the first user belongs in a group with the previously grouped user associated with the behavior signature of the previously classified activities;
      when the calculated DoV is greater than the predetermined threshold,
      determine that the first user does not belong in the same group with the previously grouped user associated with the behavior signature of the previously classified activities;

identify the first user with the data collection of information about previously classified activities of a plurality of grouped users of the computer network; and send an indication to a destination in the computer network about the determination has been identified for the first user.

12. The system of claim 11, wherein the microprocessor is further configured to create and store values for: actions of, applications running on behalf of the first user, when the first user is logged in and logged off, or a resource of the computer network shared by the first user.

13. The system of claim 11, wherein the microprocessor is further configured to create and store values for an activity of the first user comprising a beginning, end, frequency, or duration of an event related to a resource of the computer network and the first user.

14. The system of claim 11, wherein the microprocessor is further configured to create and store values for activity of the first user including first user authentication events including timing, Internet Protocol based geolocation, or device-based geolocation.

15. The system of claim 11, wherein the microprocessor is further configured to create and store values for activity of the first user including the first user's access to the first user's computer, the first user's mobile device, or a hardware device associated with the first user.

16. The system of claim 11, wherein the microprocessor is further configured to create and store values for activity of the first user including activity in a web browser or other software accessing cloud services including file storage, online collaboration, electronic mail, scheduling, file sharing, or social networks.

17. The system of claim 11, wherein the microprocessor is further configured to create and store values for the activity of the first user including first user network traffic comprising one or more of Internet Protocol addresses, port numbers, protocol types, volumes of data sent and received, and types of information sent and received.

18. The system of claim 11, wherein the microprocessor is further configured to perform an analysis based on a behavior vector of the first user using predetermined heuristic rules, statistical analysis, a neural network, or support vector machines.

19. The system of claim 11, wherein the microprocessor is further configured to perform an analysis based on a behavior vector of the first user to suggest addition or removal of the first user to or from at least one user group of the computer network.

20. The system of claim 11, wherein the microprocessor is further configured to perform a suggested action and re-assign the first user to or from a user group or communicate an assignment of the first user to at least one destination.

* * * * *